Patented Nov. 13, 1923.

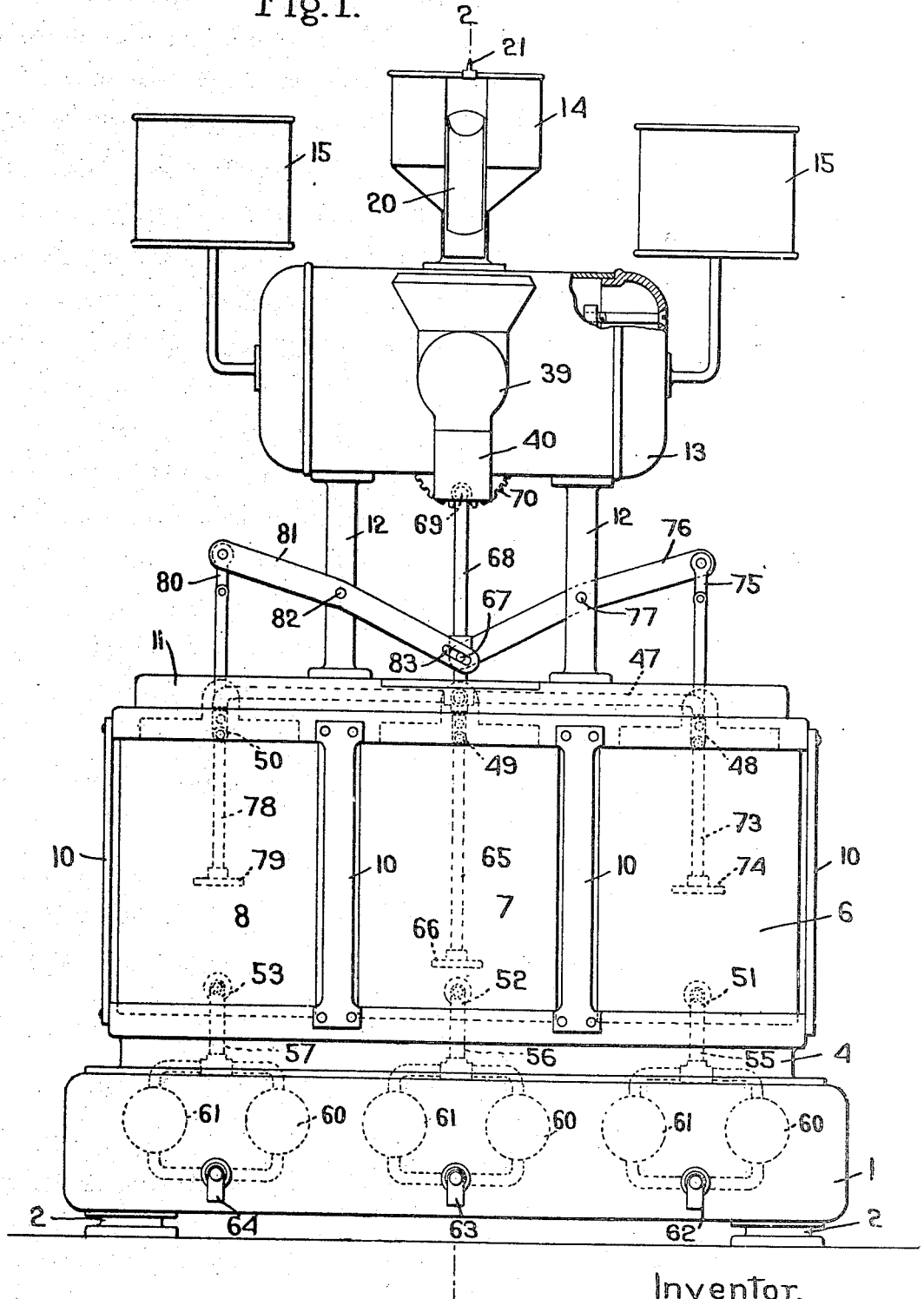

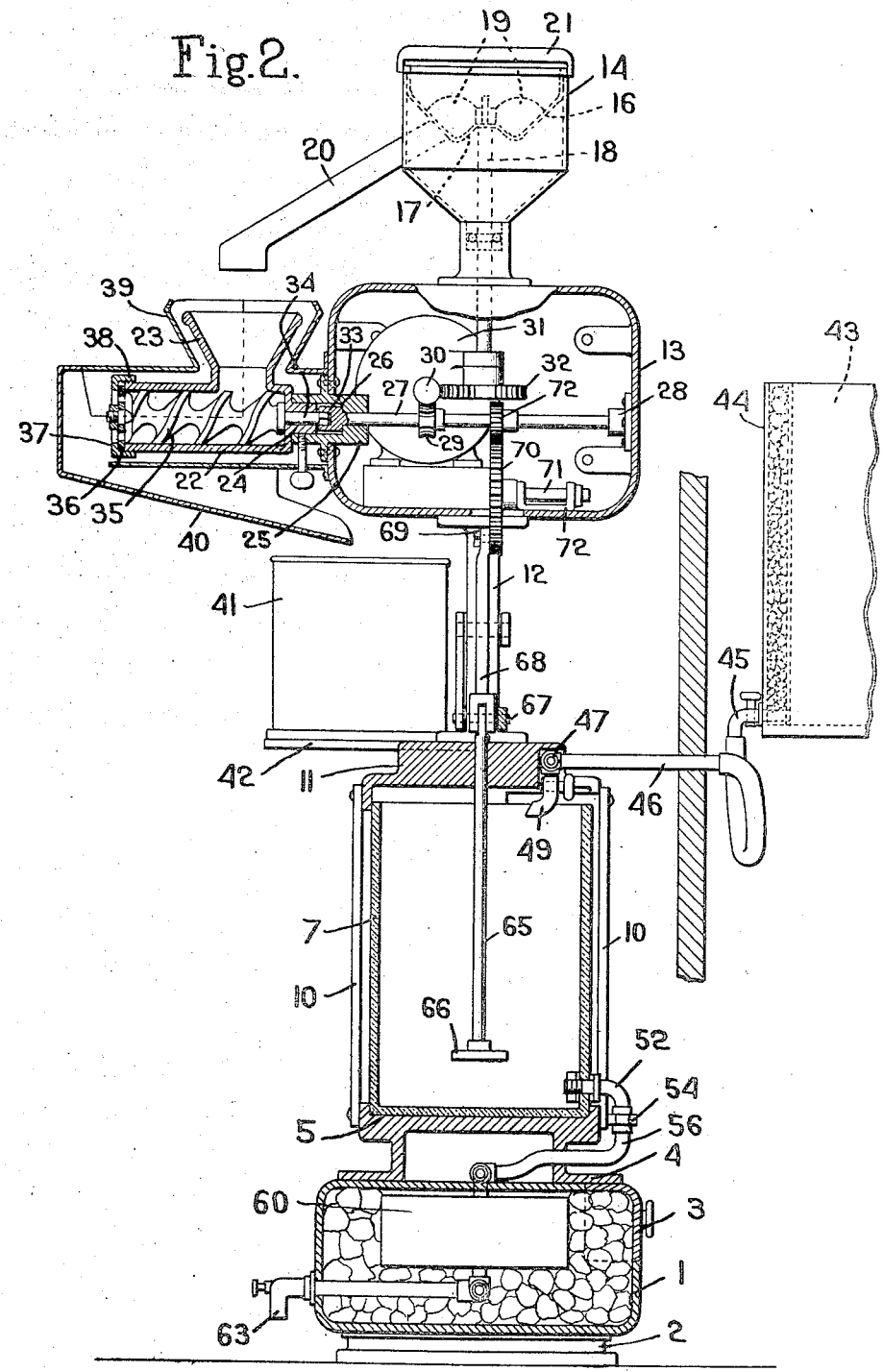

1,473,776

UNITED STATES PATENT OFFICE.

JACOB LEVIN, OF SPRINGFIELD, MASSACHUSETTS, ASSIGNOR TO THE LEBROS MANUFACTURING CO., INC., OF NEW YORK, N. Y., A CORPORATION OF MASSACHUSETTS.

DISPLAY APPARATUS FOR PREPARING AND DISPENSING FRESH-FRUIT BEVERAGES.

Application filed August 25, 1922. Serial No. 584,364.

*To all whom it may concern:*

Be it known that I, JACOB LEVIN, a citizen of the United States, and resident of Springfield, county of Hampden, State of Massachusetts, have invented an Improvement in Display Apparatus for Preparing and Dispensing Fresh-Fruit Beverages, of which the following description, in connection with the accompanying drawing, is a specification, like characters on the drawing representing like parts.

This invention relates to improvements in display apparatus for preparing and dispensing fruit juice beverages and one of the objects thereof is to provide an apparatus which will enable the beverage to be prepared from fruit, such as oranges, lemons, pineapples, etc. and dispensed under the observation of the customer.

A further object of the invention is to provide an apparatus of this character having receptacles preferably provided with transparent walls to receive the freshly prepared fruit juice beverage and provided with means for continuously agitating the beverage to produce and maintain a uniform mixture.

Another object of the invention is to provide an apparatus of the character described with means for cooling the beverage as it is drawn from the reservoir or reservoirs without contact with the ice or other cooling medium.

A further object of the invention is to provide a novel means for comminuting the fruit which will break down the cellular walls which contain the liquid constituents of the fruit so that a superior fruit juice will be produced.

Another feature of the invention consists in providing means for cutting the fruit and delivering the cut pieces automatically to the chopping and pressing mechanism without danger of injury to the hands of the operator.

A further object of the invention is to provide a motor operated apparatus of the class described in which the motor is arranged to actuate means for feeding the fruit to the chopping and pressing mechanism, for operating the chopping and pressing mechanism and also for actuating the agitators for the prepared fruit juice beverage.

These and other objects and features of the invention will more fully appear from the following description and the accompanying drawings, and will be particularly pointed out in the claims.

A preferred form of apparatus embodying the invention is illustrated in the accompanying drawings, in which;

Fig. 1, is an elevation of a fruit juice beverage preparing and dispensing apparatus in which the various mechanisms are carried by a stand in super-imposed relations and;

Fig. 2, is a vertical transverse longitudinal sectional view on line 2—2 Fig. 1.

The apparatus illustrated in the accompanying drawing desirably is in the form of a stand having a series of superimposed devices so arranged that the fresh fruit may be placed in the uppermost and successively treated, and the cooled fruit juice beverage delivered from the lowermost of said devices.

As illustrated herein, the lowermost of these devices comprises a preferably rectangular tank 1, which is supported upon legs 2, and provided with a door 3, through which ice or other refrigerating mediums may be introduced.

A standard 4, which desirably is in the form of a casting, rests upon the top of the refrigerating box 1, and is provided with a series of seats 5, which receive the bases of receptacles 6, 7 and 8, preferably having transparent walls and adapted to receive the prepared fruit juice beverage.

A plurality of pairs of posts 10, extending upwardly from the standard 4, support at their upper ends a casting 11, having downwardly extending flanges which embrace the upper ends of the receptacles 6, 7 and 8, and serves as a cover for such receptacles.

Pedestals 12, seated upon the upper face of the casting 11, serve to support a motor casing 13, and a hopper 14, which is mounted upon the top of the motor casing. Receptacles 15, of sufficient size to contain a quantity of fruit, are illustrated herein as supported upon the brackets secured to the ends of the motor casing, the receptacles 15 being conveniently positioned to enable the operator to remove the fruit therefrom, cut the same and drop the pieces thereof into the hopper as will be hereinafter more fully described.

The hopper 14 desirably is of substantially cylindrical form, and preferably is provided with a downwardly extending conical false bottom 16, which merges into an upwardly extending conical section 17, having a central bearing for a shaft 18, which carries upon its upper end one or more vanes 19, which are adapted to sweep the material in the hopper into a chute 20, which delivers it into the mouth of a suitable pressing and chopping device.

Preferably the hopper is provided with a knife 21, which extends preferably diametrically across the open upper end of the hopper and presents an upwardly extending cutting edge so that the fruit may be cut into sections and dropped into the hopper from which it will be fed into the pressing and chopping device. By reason of this construction, the operator is relieved of any danger of having his hands caught in the chopping and cutting device.

Any suitable chopping and cutting device which is adapted both to cut up and simultaneously press the material may be used within the spirit and scope of my invention.

A preferred mechanism which is illustrated herein, comprises a cast metal casing 22, having an upwardly extending hopper or mouth 23, adapted to receive the cut fruit which is delivered from the chute 20 and also provided with a cylindrical extension 24, which is seated in a complementary aperture in a block 25, secured to the side of the motor casing 13, the extension 24 being clamped in said block by a suitable set screw. The block 25 is provided with a chambered portion 26, to receive the enlarged head of a shaft 27, which is mounted in a suitable bearing in said block 25, and extends across the motor casing and is journalled at its opposite end in a bearing 28, secured to the other end of the casing. The shaft 27, is provided with a worm gear 29, which engages a worm 30, upon the shaft of an electric motor 31, which is mounted within said motor casing. The worm 30 also engages a worm gear 32, which is connected to the lower end of the shaft 18 and thereby serves to rotate the vanes 19, of the feeding mechanism of the hopper.

The shaft 27, is provided with an enlarged head 33, having shoulders which engage complementary shoulders upon the block 25 and produce, in effect, a thrust bearing. The enlarged head 33, of the shaft 27 is provided with a square socket which receives the squared end of a shaft 34 of a pressing screw 35, which is mounted in and rotatably fits within the cylindrical portion 22 of the hopper. The opposite end of the screw 35 is provided with a squared extension upon which is mounted a preferably cruciform knife 36, which cooperates with an apertured disk 37, having a bearing for the extension of said screw. The disk and knife are removably retained in place by a collar 38, which is screwed upon the end of the cylindrical casing and is provided with a flange which extends over the portion of the periphery of the apertured disk 37. The pressing and chopping device is provided with a sheet metal casing 39, the lower portion of which is in the form of a downwardly inclined chute 40, which is adapted to deliver the comminuted material and juice to a suitable receptacle 41.

In the operation of the machine the fruit is cut by the operator and dropped into the hopper. The vanes 19, which are rotated by the electric motor from the worm 30, worm gear 32 and shaft 18 sweep the pieces of fruit into the chute 20, from which they are delivered into the mouth of the chopping and pressing device. The screw 35 of the chopping and pressing device, which is rotated from the motor through the worm 30, the worm gear 29 and shaft 27, forces the pieces of fruit forwardly (to the left in Fig. 3) into the cutting field of the knife 36, and then presses the same through the apertures in the disk 37. This cutting and pressing action not only serves to comminute the fruit, but also breaks down the cellular structure which contains the juice and essential oils of the fruit and delivers the same to the chute 40, from which it passes into the receptacle 41.

The receptacle 41 is removably supported upon a suitable bracket 42, carried by the casting 11. The material which is delivered to the receptacle 41 is then strained and placed in an interior receptacle 43, of an iced tank 44, where a suitable amount of water and syrup is added to it to produce the desired beverage. The iced receptacle is provided with a faucet 45, through which the beverage may be delivered through a suitable conduit 46, to the display reservoirs 6, 7 and 8 above described.

The iced receptacle 44 may, if desired, be placed in an adjoining room and the conduit 46 leads through the partition of said room, as is fragmentarily illustrated in Fig. 2. The conduit 46, desirably communicates with a header 47, which is mounted in a suitable recess in the casting 11, and extends across the apparatus. Faucets 48, 49 and 50 which communicate with the header 47 serve to permit the beverage to be selectively drawn into any of the tanks 6, 7 and 8.

The tanks 6, 7 and 8 are provided near their bottoms respectively with outlet pipes 51, 52 and 53 which are connected by suitable unions 54, with pipes 55, 56 and 57 which lead to cooling tanks located in the refrigerator box 1. As illustrated herein, each of the pipes 55, 56 and 57 communicates with pairs of reservoirs 60 and 61, and the pairs of reservoirs 60 and 61 respectively are provided with delivery pipes leading to common faucets 62, 63 and 64 from which the cooled beverage may be drawn into glasses to be served to the customers.

In order to insure the production and maintenance of a uniform homogeneous beverage, each of the reservoirs 6, 7 and 8 is provided with means for continuously agitating the contents thereof.

In the preferred construction illustrated herein, the central reservoir 7, is provided with a dasher 65, which is reciprocably mounted in a suitable bearing in the casting 11, and is provided at its lower end with an enlarged head 66. The upper end of the dasher 65, is pivotally connected to a shaft 67, which is mounted in the bifurcated lower end of a pitman 68, the upper end of which is pivotally mounted upon a stud 69 located near the periphery of a gear 70, having a shaft 71 mounted in bearings in a suitable bracket 72, within the motor casing 13. The gear 70 engages and is driven by a pinion 72, which is fixedly secured to the motor driven shaft 27.

In the operation of the machine, therefore, the motor is utilized to drive the feeding mechanism of the hopper, the rotatable members of the pressing and chopping device and also the agitator of the reservoir 7. Where a plurality of reservoirs is employed as is illustrated in Fig. 1, the pitman may be also caused to actuate similar agitating devices. As shown herein the reservoir 6 is provided with a dasher 73, which is reciprocably mounted in a suitable bearing in the casting 11, and is provided with an enlarged head 74. The upper end of the dasher 73, is pivotally connected to a link 75, which is pivotally mounted upon the outer end of a lever 76, which desirably is fulcrumed upon a stud 77 on the post 12. The other end of the lever 76 is provided with a slot which embraces the shaft 67, which is mounted in the bifurcated end of the pitman 68. Likewise the reservoir 8 is provided with a dasher 78, reciprocably mounted in a bearing in the casting 11, and provided with a head 79. The upper end of the dasher 78 is connected to a link 80, which in turn is pivoted to the outer end of a lever 81, which is fulcrumed upon a stud 82 on the other post 12.

The opposite end of the lever 81 is likewise provided with a slot 83, which embraces the shaft 67, which extends through the bifurcated end of the pitman 68. By reason of this construction the motor actuated pitman 67, directly reciprocates the dasher 65, and acting through the levers 76 and 81 reciprocates the dashers 73 and 78 simultaneously with the reciprocation of the dasher 65, but in opposite directions to the movements thereof.

By providing a plurality of reservoirs, a sufficient supply of beverage may be kept on hand to serve a large number of people. By selectively drawing the beverage from different reservoirs, the beverage may be permitted to remain in the coolers a sufficient length of time to give it the desired temperature.

By reason of the present invention, therefore, an apparatus of pleasing appearance is provided which enables the customers to observe the manufacture of the beverage and the sanitary storage thereof, and to receive a properly cooled service of a uniformly mixed beverage.

The reservoirs 6, 7 and 8 may be supplied with the same beverage or if desired different fruits may be chopped and pressed and the beverage prepared from such different fruits drawn from tanks 43 into the different reservoirs 6, 7 and 8.

The reservoirs 6, 7 and 8 may be removed from their support by uncoupling the unions 54, and tilting the reservoirs up sufficiently to permit them to be removed from their seats, the flange of the casing 11, being cut away for such purpose as illustrated in Fig. 2.

It will be understood that the embodiment of the invention disclosed herein is illustrative and not restrictive and that various changes in form, construction and arrangement of parts may be made within the spirit and scope of the claims.

Having thus described my invention, what I claim as new, and desire to secure by Letters Patent is:

1. Display apparatus for preparing and dispensing fruit juice beverages comprising a stand having a motor casing supported thereupon at a distance from the base thereof, a motor in said casing, a hopper for the fruit super-imposed upon said motor casing, a knife mounted on said hopper having an upwardly extending edge, a pressing and chopping device mounted on said motor casing having rotatable pressing and chopping members connected to said motor, a conduit leading from said hopper to said chopper, a rotatable member in said hopper connected to said motor acting to feed the fruit from said hopper to said chopper, and means to receive the comminuted pulp and juice from said pressing and chopping device.

2. Display apparatus for preparing and dispensing fresh fruit juice beverages comprising a motor casing, a motor therein, a hopper mounted above said motor casing and provided with feeding means for forcing the fruit from said hopper, pressing and cutting means extending laterally from said motor casing, simultaneously operable with said feeding means to feed fruit from said hopper to said chopper, said pressing and cutting means acting to comminute the body of the fruit to break up the cellular walls thereof which contain the liquid constituents of the fruit.

In testimony whereof, I have signed my name to this specification.

JACOB LEVIN.